United States Patent
Takami et al.

(10) Patent No.: US 9,733,948 B2
(45) Date of Patent: Aug. 15, 2017

(54) INFORMATION PROCESSING DEVICE, INFORMATION PROCESSING METHOD, AND RECORDING MEDIUM STORING CONTROL PROGRAM

(71) Applicant: FUJITSU LIMITED, Kawasaki-shi, Kanagawa (JP)

(72) Inventors: Atsushi Takami, Kawasaki (JP); Koji Fujita, Kawasaki (JP); Haruhiko Ueno, Sagamihara (JP)

(73) Assignee: FUJITSU LIMITED, Kawasaki (JP)

( * ) Notice: Subject to any disclaimer, the term of this patent is extended or adjusted under 35 U.S.C. 154(b) by 219 days.

(21) Appl. No.: 14/483,334

(22) Filed: Sep. 11, 2014

(65) Prior Publication Data
US 2015/0134945 A1 May 14, 2015

(30) Foreign Application Priority Data
Nov. 8, 2013 (JP) ................................. 2013-232079

(51) Int. Cl.
G06F 9/44 (2006.01)
(52) U.S. Cl.
CPC .................................. G06F 9/4401 (2013.01)
(58) Field of Classification Search
CPC .................................................. G06F 9/4401
See application file for complete search history.

(56) References Cited

U.S. PATENT DOCUMENTS

| | | | | |
|---|---|---|---|---|
| 4,839,506 A | * | 6/1989 | Homma | G06Q 20/341 235/379 |
| 5,968,136 A | * | 10/1999 | Saulpaugh | G06F 9/468 710/3 |
| 9,213,609 B2 | * | 12/2015 | Hansen | G06F 11/2046 |
| 2002/0124166 A1 | * | 9/2002 | Lee | G06F 8/65 713/100 |
| 2007/0192549 A1 | * | 8/2007 | Oh | G06F 12/1009 711/154 |
| 2008/0177978 A1 | * | 7/2008 | Karamcheti | G06F 9/5016 711/206 |

(Continued)

FOREIGN PATENT DOCUMENTS

JP 2000-517085 12/2000
JP 2002-268900 9/2002

*Primary Examiner* — Thomas Lee
*Assistant Examiner* — Mohammad A Rahman
(74) *Attorney, Agent, or Firm* — Staas & Halsey LLP (57) ABSTRACT

An information processing device, includes: a storage to store a program to be booted; a central processing unit to start a plurality of booting programs and read the program stored in the storage using a virtual address; a main memory to store the program based on a read instruction of the program; and a controller, including an address translator that translates a virtual address into a physical address, to read the program from the storage according to the read instruction, and write the read program in a plurality of discontinuous areas of the main memory on the physical address, wherein the central processing unit executes a start module which sets a virtual address space in the central processing unit and the controller before the plurality of booting programs are booted, and reads the written program from the main memory using the virtual address which is designated by the reading instruction.

16 Claims, 7 Drawing Sheets

(56) References Cited

U.S. PATENT DOCUMENTS

| | | | |
|---|---|---|---|
| 2012/0226850 A1* | 9/2012 | Nakanishi | G06F 12/1009 |
| | | | 711/102 |
| 2013/0103984 A1* | 4/2013 | Nakaide | G06F 11/273 |
| | | | 714/27 |
| 2013/0219110 A1* | 8/2013 | Landenbach | G06F 12/0246 |
| | | | 711/103 |
| 2014/0298026 A1* | 10/2014 | Isozaki | H04L 9/0825 |
| | | | 713/171 |
| 2015/0039876 A1* | 2/2015 | Baratam | G06F 9/4401 |
| | | | 713/2 |

* cited by examiner

INFORMATION PROCESSING DEVICE, INFORMATION PROCESSING METHOD, AND RECORDING MEDIUM STORING CONTROL PROGRAM

CROSS-REFERENCE TO RELATED APPLICATION

This application is based upon and claims the benefit of priority from the prior Japanese Patent Application No. 2013-232079 filed on Nov. 8, 2013, the entire contents of which are incorporated herein by reference.

FIELD

The embodiments discussed herein are related to an information processing device, a control method of an information processing device, and a recording medium in which a control program is stored.

BACKGROUND

When a computer is turned on, a booting program is used to start an operation system (OS).

Related technologies are disclosed in Japanese Laid-Open Patent Publication No. 2002-268900 or Japanese National Publication of International Patent Application No. 2000-517085.

SUMMARY

According to one aspect of the embodiments, an information processing device, includes: a storage configured to store a program to be booted; a central processing unit configured to start a plurality of booting programs and read the program stored in the storage using a virtual address; a main memory configured to store the program based on a read instruction of the program from the central processing unit; and a controller, including an address translator that translates a virtual address into a physical address, configured to read the program from the storage according to the read instruction from the central processing unit, and write the read program in a plurality of discontinuous areas of the main memory on the physical address, wherein the central processing unit executes a start module which sets a virtual address space in the central processing unit and the controller before the plurality of booting programs are booted, and reads the written program from the main memory using the virtual address which is designated by the reading instruction.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

DESCRIPTION OF EMBODIMENTS

A booting program includes a boot loader which is installed in an application layer to read a program to be booted, and a booting program base unit which includes a device driver to provide an application programming interface (API) to the boot loader. The API refers to a set of functions provided by a kernel of the OS. The OS provides a certain function to a program such as a booting program through a function included in the API. The booting program may be executed by a central processing unit (CPU) of the computer. A control program which controls the booting program to be executed may be executed by the CPU and provided to the computer through a recording medium. The CPU causes a controller, such as a peripheral component interconnect (PCI) root bridge, to write an OS image stored in a storage into a main memory unit and reads out the OS image written in the main memory unit.

The booting program includes a booting program operated on a physical address and a booting program operated on a virtual address.

When the booting program operated on the physical address is used, the booting program and the controller manage the address of the main memory unit using the physical address. When the OS image in the storage is read into the main memory unit, all modules are operated based on an address system of the physical address. An example of a configuration in which the booting program is operated on the physical address includes a configuration where an architecture of the CPU is an Intel architecture (IA), the booting program is a unified extensible firmware interface (UEFI), the OS is a Windows (registered trademark) or IA Linux (registered trademark), and the PCI root bridge does not have an address translator.

When the booting program operated on the virtual address is used, the booting program and the controller manage the address of the main memory unit using the virtual address. When the OS image in the storage is read into the main memory unit, all modules are operated based on an address system of the virtual address. An example of a configuration in which the booting program operates on the virtual address includes a configuration where an architecture of the CPU is a scalable processor architecture (SPARC), the booting program is an open firmware, the OS is a Solaris or SPARC Linux (registered trademark), and the PCI root bridge has an address translator For example, when a new hardware is installed in the computer, the new hardware may not support the booting program base unit which is supported by an existing OS to provide the API to the boot loader. The new hardware may support a new booting program base unit which has a separate booting structure from the booting program base unit. A booting program base unit supported by the hardware is referred to as a first booting program base unit for the purpose of convenience. The booting program base unit supported by the OS to provide the API to the boot loader is referred to as a second booting program base unit, for the purpose of convenience.

In order to cope with the above-described case, a configuration may be provided in which the first booting program base unit is included as a booting program in addition to the boot loader and the second booting program base unit. The second booting program base unit uses a function of the first booting program base unit through the emulation. An example of the above-described configuration includes a basic input/output system (BIOS) emulation on the UEFI. For example, the UEFI and the BIOS, which individually operate on the physical address, are included as a booting program so that the UEFI uses the function of the BIOS through the emulation.

For example, a firmware component performs a plurality of functions and services for an operating system image which runs in a logically divided data processing system. For example, in the earliest initial program load (IPL) stage, the system firmware executes a hardware detection of an input/output (I/O) sub system and initializes a system address range according to a system memory map to allocate the system address range to the hardware, in order to present the hardware. In an open firmware stage of the IPL, the open firmware creates an open firmware device tree based on a current hardware in the system. In the final stage of the IPL, a runtime abstraction service (RTAS) firmware learns of hardware information and provides the service to the operating system during a runtime. When an error exception is generated in the system during the runtime, the RTAS analyzes a hardware problem to separate the hardware. The RTAS performs a detecting process to create a data structure in order to describe the hardware.

For example, in the computer system, when the computer is turned on, the booting program in the firmware is executed. In order to discriminate an addressable hardware device, coupled to the system, for the processor and discern a location of the addressable hardware device, an input/output space is scanned. Database of device information is created using obtained discrimination information and absolute address information of the device. Thereafter, an operating system code is loaded in a system memory.

For example, the booting program may include a first booting program base unit which is supported by a hardware installed in the computer and operates on the physical address, and a boot loader and a second booting program base unit which are supported by the OS and operate on the logical address. The second booting program base unit may be operated using a function of the first booting program base unit through the emulation.

Figure 1:
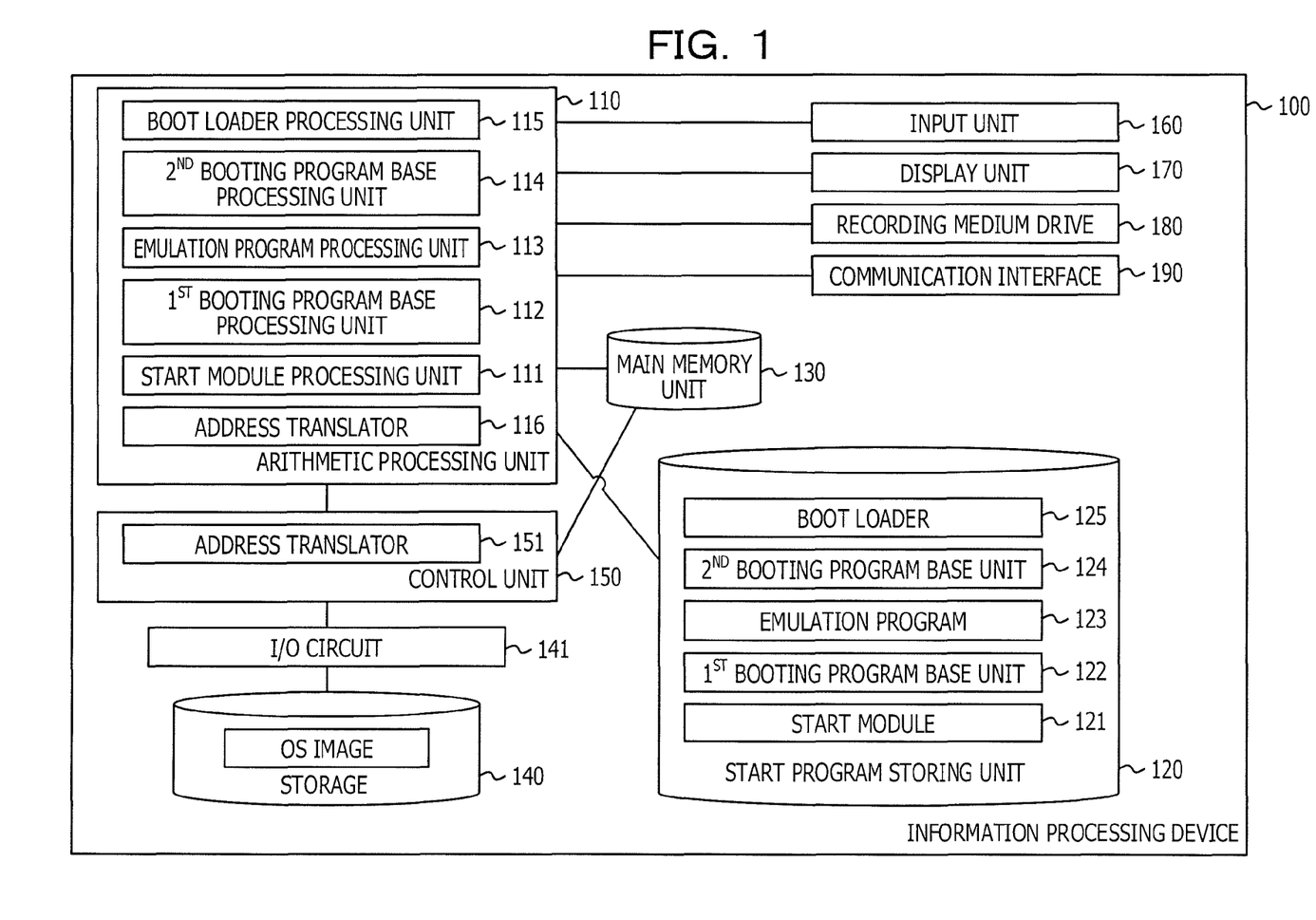
FIG. 1 illustrates an example of an information processing device.

FIG. 1 illustrates an example of an information processing device.

An information processing device 100 illustrated in FIG. 1 may be a computer. As illustrated in FIG. 1, the information processing device 100 includes an arithmetic processing unit 110, a start program storing unit 120, a main memory unit 130, a storage 140, an input/output (I/O) circuit 141, a control unit 150, an input unit 160, a display unit 170, a recording medium drive 180, and a communication interface 190.

The arithmetic processing unit 110 may be a central processing unit (CPU). The arithmetic processing unit 110 includes a start module processing unit 111, a first booting program base processing unit 112, an emulation program processing unit 113, a second booting program base processing unit 114, and a boot loader processing unit 115. The arithmetic processing unit 110 includes an address translator 116 which translates a virtual address to a physical address.

The start program storing unit 120 may be a device which stores a program that starts after the information processing device 100 is turned on and for example, may be a read only memory (ROM) or a flash memory. A start module 121, a first booting program base unit 122, an emulation program 123, a second booting program base unit 124, and a boot loader 125 are stored in the start program storing unit 120.

The start module 121 may be a program which builds a virtual address space on the arithmetic processing unit 110 and the control unit 150 before the booting program is started.

The first booting program base unit 122 may be a program which is supported by various hardwares provided in the information processing device 100 and provides an API (a first API), for example, a first function to the application program. The first booting program base unit 122 may be programmed so as to be operated on the physical address. The first booting program base unit 122 may include an UEFI or a BIOS. The API may be a set of functions which are provided by a kernel of the OS. The OS provides a certain function to a program such as a booting program, through a function included in the API.

The second booting program base unit 124 may be a program which provides an API (a second API), for example, a second function, to the boot loader 125 serving as an application program. The second booting program base unit 124 may be programmed so as to be operated on the virtual address. The boot loader 125 may be a program which is supported by the OS stored in the storage 140. The second booting program base unit 124 and the boot loader 125 may include, for example, an open firmware.

The first booting program base unit 122, the second booting program base unit 124, and the boot loader 125 may be booting programs which are provided in the information processing device 100.

The emulation program 123 may be a program which provides an environment where the second booting program base unit 124 is operated using a function of the first booting program base unit 122. For example, the emulation program 123 may be a program which converts a call of a driver in the second booting program base unit 124 into a function of the API provided by the first booting program base unit 122.

The main memory unit 130 may be a main memory device which temporally stores a program being executed or data being processed and is directly accessed by the arithmetic processing unit 110 and may be, for example, a random access memory (RAM). Various programs 121 to 125 stored in the start program storing unit 120 are read into the main memory unit 130 and executed by corresponding processing units 111 to 115 in the arithmetic processing unit 110. For example, the start module 121 is read into the main memory unit 130 before starting the booting programs 122, 124, and 125 to be executed by the start module processing unit 111. The start module 121 may be erased from the main memory unit 130 after starting the booting programs 122, 124, and 125 so that the start module processing unit 111 may not be operated.

The storage 140 may be a hard disk drive (HDD). The storage 140 may include a program to be booted, such as an OS image.

The I/O circuit 141 may be an input/output interface to the storage 140 and for example, an integrated circuit such as a large scale integration (LSI). The I/O circuit 141 may be a part of the storage 140.

The control unit 150 may be, for example, a controller such as a PCI root bridge or a PIC express (PCIe) root bridge. The control unit 150 includes an address translator 151 which translates a virtual address into a physical address.

The input unit 160 may include, for example, a key board or a mouse. The display unit 170 may be, for example, a liquid crystal display.

The recording medium drive 180 may be a device which reads data recorded in a recording medium and/or writes the data into the recording medium. The recording medium may include, for example, a compact disk read only memory (CD-ROM), a digital versatile disk (DVD), a universal serial bus (USB) memory, or a flash memory. Various programs 121 to 125 in the start program storing unit 120 may be recorded in the recording medium and the various programs 121 to 125 recorded in the recording medium may be stored in the start program storing unit 120 by the drive 180 for a recording medium.

The communication interface 190 may be an interface which couples between the information processing device 100 and an external network such as a local area network (LAN) or the Internet. The various programs 121 to 125 in the start program storing unit 120 may be transmitted from another information processing device (not illustrated) through the communication interface 190 to be stored in the start program storing unit 120.

In the information processing device 100, before the booting programs 122, 124, and 125 are read into the main memory unit 130 so that corresponding processing units 112, 114, and 115 start processings, the start module 121 is read into the main memory unit 130. The start module processing unit 111 performs the processing according to the start module 121.

For example, the start module processing unit 111 creates an address translation table between the physical address and the virtual address. The start module processing unit 111 registers the created address translation table in the arithmetic processing unit 110 and the control unit 150. The start module processing unit 111 creates information on a memory resource or an I/O resource which is assigned to the first booting program base processing unit 112 which executes the first booting program base unit 122 which is operated on the physical address, by the virtual address. The start module processing unit 111 registers the created virtual address in the arithmetic processing unit 110 and the control unit 150. By the processing of the start module processing unit 111 like this, a virtual address space required for the second booting program base processing unit 114 to be operated according to the second booting program base unit 124 may be built in the arithmetic processing unit 110 and the control unit 150 before booting the booting programs 122, 124, and 125. The first booting program base processing unit 112 which executes the first booting program base unit 122 may be operated on the built virtual address space.

The booting programs 122, 124, and 125 may be sequentially started after building the virtual address space in the arithmetic processing unit 110 and the control unit 150 by the start module 121.

Figure 2:
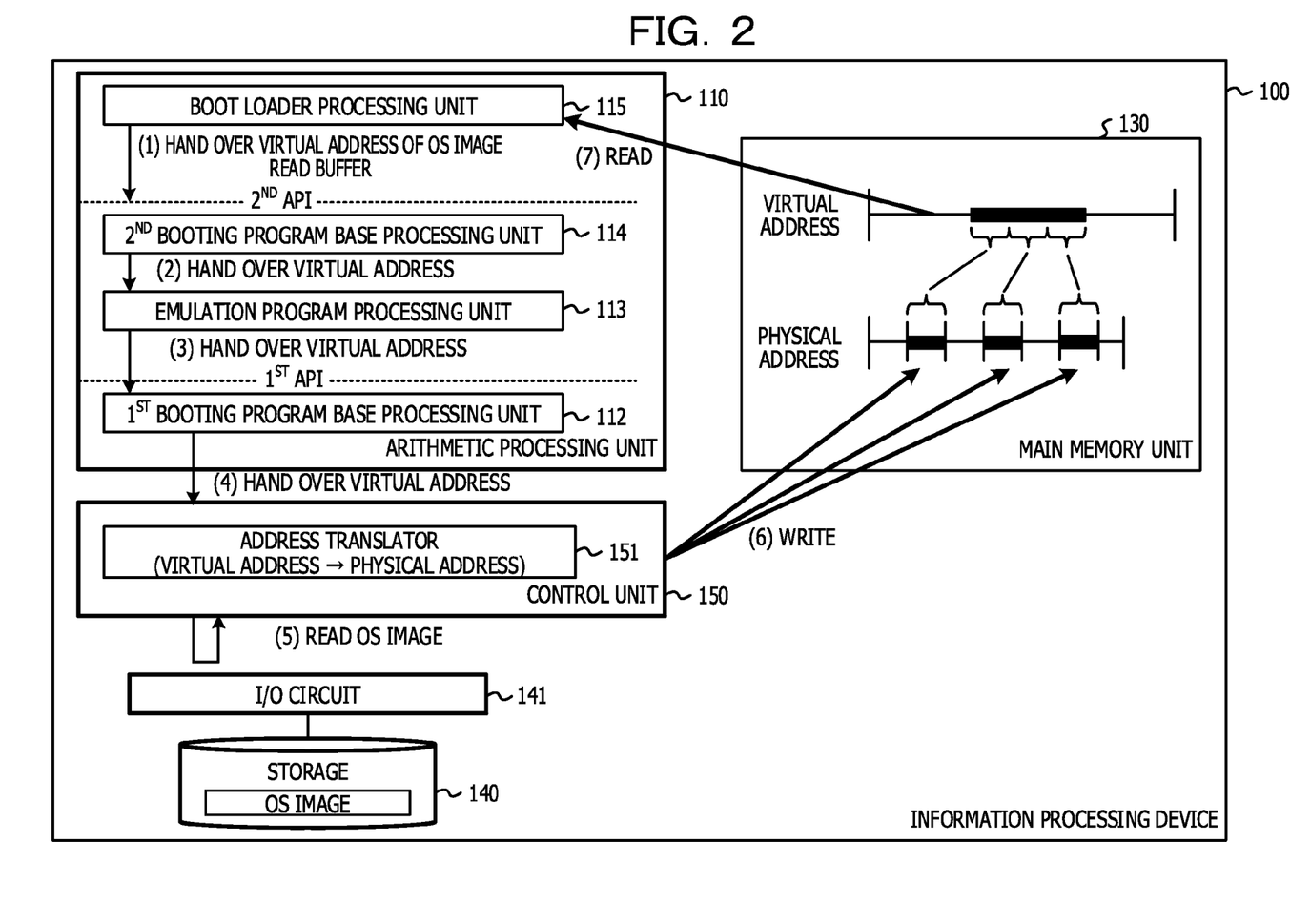
FIG. 2 illustrates an example of a read processing of a program to be booted.

FIG. 2 illustrates an example of a read processing of a program to be booted. In FIG. 2, a processing of reading the program to be booted is performed by the information processing device. FIG. 2 illustrates the information processing device 100 after the booting program is started. For the purpose of clear description, some of the components included in the information processing device 100 illustrated in FIG. 1 may be illustrated in FIG. 2.

In the information processing device 100 illustrated in FIG. 1, the virtual address space is built on the arithmetic processing unit 110 and the control unit 150 before the booting program is started. Therefore, in a read processing of an OS image which is an example of the program to be booted, the information processing device 100 may be operated as follows.

As illustrated in FIG. 2, the boot loader processing unit 115 which executes the boot loader 125 designates an address on the main memory unit 130 for reading the OS image using the virtual address. The address which is designated by the boot loader processing unit 115 is handed over to the second booting program base processing unit 114 which executes the second booting program base unit 124 (processing (1) of FIG. 2). The address designated by the boot loader processing unit 115 is handed over to the emulation program processing unit 113 which executes the emulation program 123 via the second booting program base processing unit 114 (processing (2)).

The emulation program processing unit 113 translates a function of the API (second API) which is provided by the second booting program base unit 124 into a function of the API (first API) which is provided by the first booting program base unit 122. The emulation program processing unit 113 hands over the address, which is received from the boot loader processing unit 115 through the second booting program base processing unit 114 and is the virtual address as it is, to the first booting program base processing unit 112 which executes the first booting program base unit 122 (processing (3)). As described above, the emulation program processing unit 113 may not perform address translation for the address designated by the boot loader processing unit 115.

The first booting program base processing unit 112 designates an address which is designated by the boot loader processing unit 115, for example, an address for reading an OS image, with respect to the control unit 150 which includes the address translator 151 using the virtual address (processing (4)).

The control unit 150 translates the address which is designated by the first booting program base processing unit 112, from the virtual address into the physical address using the address translator 151. The control unit 150 reads the OS image stored in the storage 140 through the I/O circuit 141 (processing (5) and writes the read OS image in a plurality of discontinuous physical addresses divided in a page unit in the main memory unit 130 (processing (6)).

The boot loader processing unit 115 reads the OS image which is written in the main memory unit 130 using the physical address corresponding to the designated virtual address, from the designated virtual address (processing (7)).

In the information processing device, a configuration is provided in which the first booting program base unit which is supported by a hardware loaded in a computer and operates on the physical address, the boot loader supported by the OS and operates on the logical address and the second booting program base unit are included as booting programs, and in which the second booting program base unit is operated using the function of the first booting program base unit through the emulation. The information processing device may be used when an OS is operated which supports an open firmware on the hardware supported by the UEFI or the BIOS.

Figure 3:
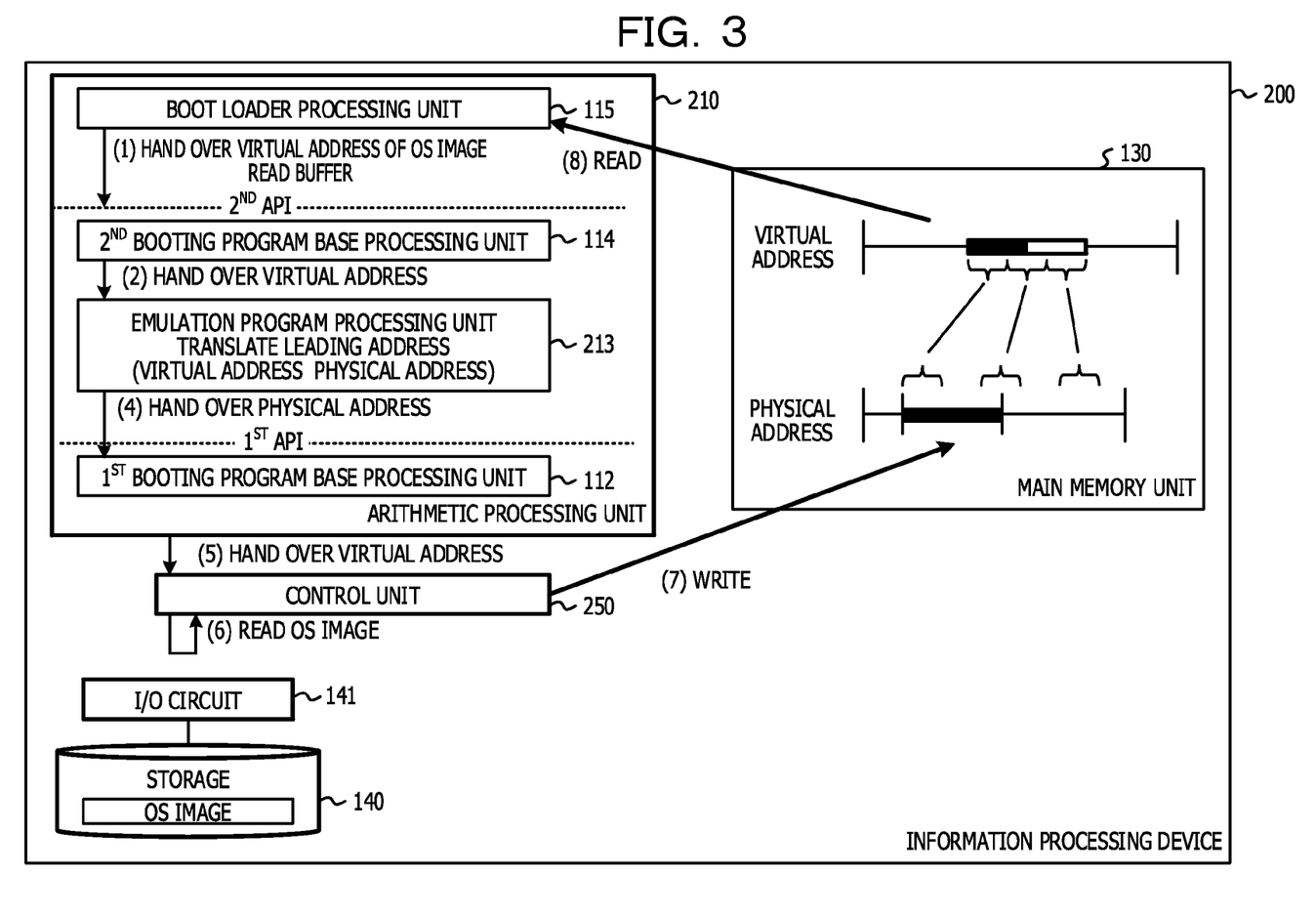
FIG. 3 illustrates an example of a read processing of a program to be booted.

In the information processing device 100, for example, the processing load of the arithmetic processing unit 110 may be reduced as compared with the configuration of the information processing device 200 illustrated in FIG. 3.

FIG. 3 illustrates an example of a read processing of a program to be booted. In FIG. 3, components which are substantially the same as or similar to the components of the information processing device 100 illustrated in FIG. 1 are denoted by the same reference numerals and descriptions thereof may be omitted or reduced.

In the information processing device 200, the second booting program base processing unit 114 which executes the second booting program base unit 124 may be operated using a function of an API (a first API) provided by the first booting program base processing unit 212 which executes the first booting program base unit 122. The configuration of the information processing device 200 may be substantially the same as or similar to the configuration of the information processing device 100 illustrated in FIG. 1. The first booting program base unit 122 is programmed so as to be operated on the physical address and the second booting program base unit 124 is programmed so as to be operated on the virtual address.

For example, the information processing device 200 may not include the start module 121 and the start module processing unit 111 which executes the start module 121. Unlike the information processing device 100 illustrated in FIG. 1, in the information processing device 200, the virtual address space may not be built on the arithmetic processing unit 110 and the control unit 150 before the booting programs 122, 124, and 125 are started. Therefore, in order for the boot loader processing unit 115 which executes the boot loader 125 to read the program to be booted, the information processing device 200 may be configured as follows.

The second booting program base unit 124 is started as one application program of the first booting program base unit 122 after the first booting program base unit 122 is initialized. The second booting program base processing unit 114 which executes the booted second booting program base unit 124 builds a virtual address space for the second booting program base unit 124. The first booting program base unit 122 which is operated on the physical address is not operated on the virtual space which is built by the second booting program base processing unit 114. Therefore, an arithmetic processing unit 210 is operated on the virtual space only when the second booting program base unit 124 and the emulation program are operated. The driver of the first booting program base unit 122 is operated on the physical address so that a hardware (I/O device) of the information processing device 200 which supports the first booting program base unit 122 is operated on the physical address.

As illustrated in FIG. 3, in the information processing device 200, the second booting program base processing unit 114 which executes the second booting program base unit 124 requests transmission of a direct memory access (DMA) of the I/O using the continuous virtual addresses (processing (2)). The function of the API (a first API) provided by the first booting program base unit 122 may include only a function of executing the transmission of the DMA of the I/O using the continuous physical addresses (processing (5)). When the first booting program base processing unit 212 which executes the first booting program base unit 122 does not have a structure to execute the I/O request from the second booting program base processing unit 114, the second booting program base unit 124 may be put into an inoperative state. Therefore, an emulation program and an emulation program processing unit 213 which executes the emulation program may include such a structure.

For example, the emulation program processing unit 213 which executes the emulation program partitions the DMA transmission (processing (1)), which is requested from the boot loader 125 through the function of the second API provided by the second booting program base unit 124, by page boundaries to be divided into a plurality of I/O requests. The emulation program processing unit 213 translates the plurality of divided I/O requests into continuous physical addresses (processing (3)). The emulation program processing unit 213 outputs the I/O request translated into the physical address to the first booting program base processing unit 212 through the first API (processing (4)).

When the emulation program and the emulation program processing unit 213 which executes the emulation program have the above-described structure, the first booting program base processing unit 212 executes the I/O request from the second booting program base processing unit 114, and the program to be booted is read from the storage 140 into the main memory unit 130.

For example, the control unit 250 reads the OS image stored in the storage 140 through the I/O circuit 141 without translating the address from the virtual address into the physical address (processing (6)). The control unit 250 writes the read OS image in the continuous physical addresses in the main memory unit 130 (processing (7)). The boot loader processing unit 115 reads the OS image written in the main memory unit 130 based on the continuous physical addresses corresponding to a plurality of virtual addresses divided by page boundaries, using designated virtual addresses (processing (8)).

In the information processing device 200, a complicated processing on a page boundary is performed by the emulation program processing unit 213. Therefore, the processing load of the arithmetic processing unit 210 including the emulation program processing unit 213 may be increased.

For example, in the information processing device 100 illustrated in FIG. 1 or 2, the arithmetic processing unit 110 and the control unit 150 migrate to a virtual address environment prior to a timing when the booting programs 122, 124, and 125 are started. Therefore, in the information processing device 100, when the second booting program base unit 124 designed for a virtual address is operated on the first booting program base unit 122 designed for a physical address, a complicated processing on the page boundary may not occur. Therefore, in the information processing device 100, the processing load of the arithmetic processing unit 110 may be reduced.

A virtual address space is built in the information processing device 100 so that the program to be booted is read in.

Figure 4:
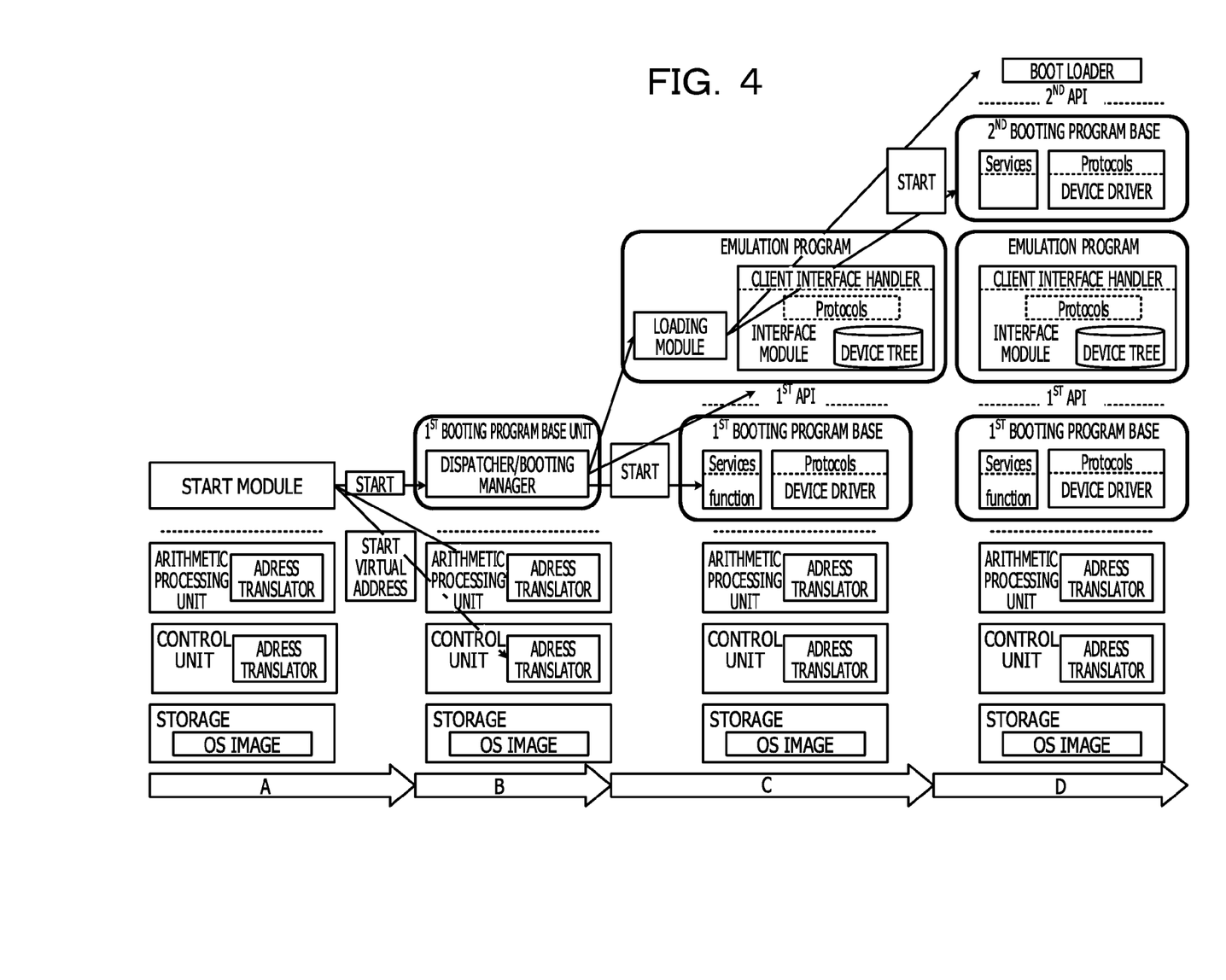
FIG. 4 illustrates an example of a processing of an information processing device.

FIG. 4 illustrates an example of a processing of an information processing device. FIG. 4 illustrates time-line operations of the information processing device 100 starting from building a virtual address space to reading a program to be booted. Thick arrows A to D illustrated at the bottom of FIG. 4 represent a time flow. Operations of components of the information processing device 100 are illustrated above the arrows A to D.

Figure 5:
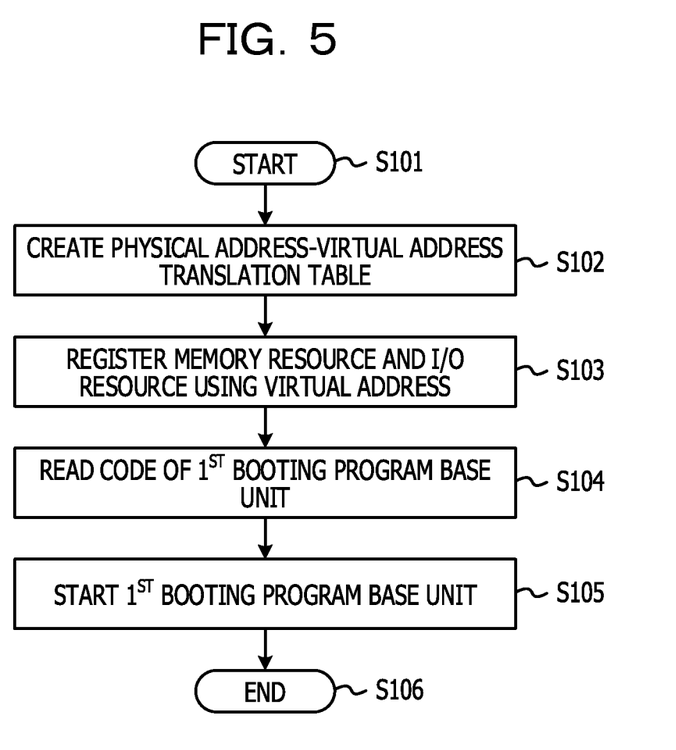
FIG. 5 illustrates an example of a processing of a start module processing unit.

At the time A illustrated in FIG. 4, when the information processing device 100 is turned on, a start module 121 is started first. The start module 121 may be a program which starts the arithmetic processing unit 110 and the control unit 150 using the virtual addresses. The start module 121 may be a program which starts the first booting program base unit 122. The start module processing unit 111 which executes the start module 121 may perform, for example, a processing illustrated in FIG. 5. FIG. 5 illustrates an example of a processing of a start module processing unit.

In operation S101, the processing by the start module processing unit 111 starts. In operation S102, the start module processing unit 111 creates an address translation table (page table) between physical addresses and virtual addresses before the booting programs 122, 124, and 125 are started. The start module processing unit 111 registers the created address translation table in the arithmetic processing unit 110 and the control unit 150.

In operation S103, the start module processing unit 111 creates a memory resource and an I/O resource using virtual addresses. The start module processing unit 111 registers information on the created memory resource and I/O resource in the arithmetic processing unit 110 and the control unit 150. The information on the memory resource and the I/O resource may be given to the first booting program base unit 122, which is operated on the physical address, using the virtual address by the processing of operation S103.

In operation S104, the start module processing unit 111 reads the code of the first booting program base unit 122 into the main memory unit 130. In operation S105, the start module processing unit 111 starts the first booting program base unit 122 and ends a series of processings (operation S106).

As represented by the time B of FIG. 4, the arithmetic processing unit 110 and the control unit 150 are started using the virtual address by the above-described processing by the start module processing unit 111 which executes the start module 121. The first booting program base unit 122 is started by the processing of the start module processing unit 111.

At the time B illustrated in FIG. 4, a dispatcher and a booting manager included in the first booting program base unit 122 start a device driver included in the first booting program base unit 122. The dispatcher and the booting manager start a loading module and an interface module which are included in the emulation program 123. The above-described processing by the dispatcher and the booting manager may be performed by the first booting program base processing unit 112.

As represented by the time C of FIG. 4, the loading module and the interface module included in the emulation program 123 are started by the above-described processing of the first booting program base processing unit 112. The loading module may be a module which starts the second booting program base unit 124 and the boot loader 125. The interface module may be a module which processes a driver call by the second booting program base unit 124.

Figure 6:
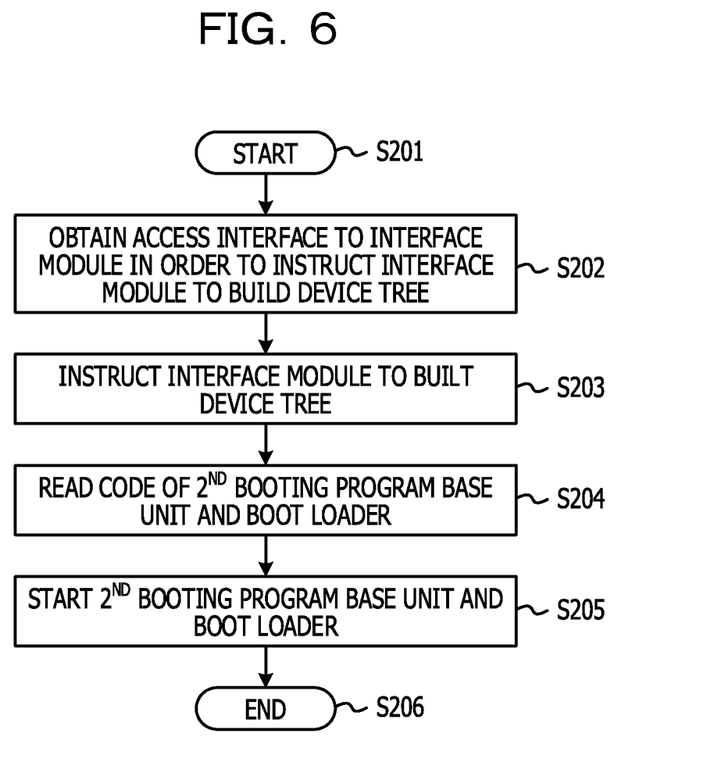
FIG. 6 illustrates an example of a processing of an emulation program processing unit.

At the time C illustrated in FIG. 4, the emulation program processing unit 113 which executes the loading module performs the processing illustrated in FIG. 6. FIG. 6 illustrates an example of a processing of an emulation program processing unit. In FIG. 6, a processing of the emulation program processing unit which executes the loading module is illustrated.

In order to operate the second booting program base unit 124, an interface module which calls a driver of the second booting program base unit 124 needs to maintain a device tree. When a series of processings start in operation S201, the emulation program processing unit 113 which executes the loading module obtains, in operation S202, an access interface to the interface module in order to instruct the interface module to build the device tree. In operation S203, the emulation program processing unit 113 instructs the interface module to build the device tree.

In operation S204, the emulation program processing unit 113 which executes the loading module reads executing codes of the second booting program base unit 124 and the boot loader 125 using the function of the first API which is provided by the first booting program base unit 122, and reads the executing codes into the main memory unit 130. In operation S205, the emulation program processing unit 113 starts the second booting program base unit 124 and the boot loader 125.

The emulation program processing unit 113 which executes the loading module hands over information, such as an entry point to access the interface module when the second booting program base unit 124 is started, to the second booting program base unit 124. When the second booting program base unit 124 is started, the control is handed over to the second booting program base unit 124 from the loading module. The emulation program processing unit 113 which executes the loading module ends a series of processings and the loading module disappears from the main memory unit 130 (operation S206).

As represented by the time D of FIG. 4, the second booting program base unit 124 and the boot loader 125 are started by the above-described processing of the emulation program processing unit 113 which executes the loading module.

Figure 7:
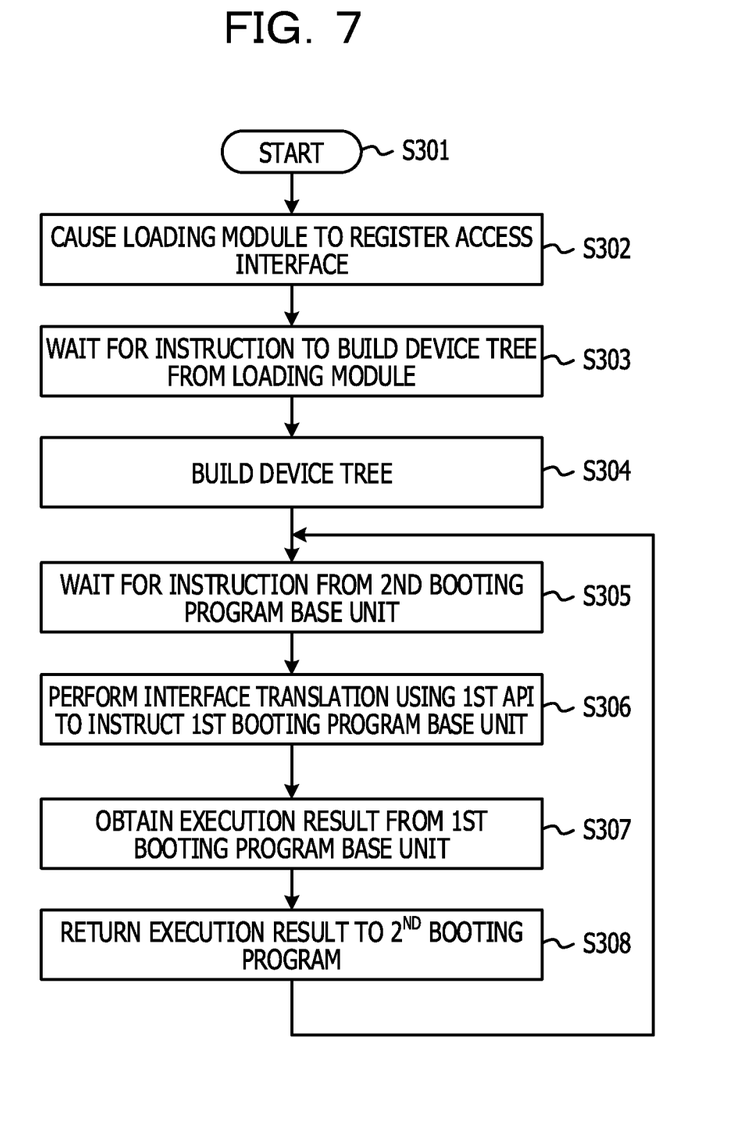
FIG. 7 illustrates an example of processing of an emulation program processing unit.

At the time D illustrated in FIG. 4, the emulation program processing unit 113 which executes the interface module performs the processing illustrated in FIG. 7. FIG. 7 illustrates an example of a processing of an emulation program processing unit. In FIG. 7, a processing of the emulation program processing unit which executes the interface module is illustrated. Operations S301 to S304 illustrated in FIG. 7 may be performed at the time C illustrated in FIG. 4.

When a series of processings start (operation S301), in operation S302, the emulation program processing unit 113 which executes the interface module causes the loading module to register an access interface to the interface module. In operation S303, the emulation program processing unit 113 waits for an instruction to build a device tree from the loading module. In operation S304, the emulation program processing unit 113 builds the device tree according to the instruction to build a device tree from the loading module. In operation S304, the emulation program processing unit 113 which executes the interface module may provide the built device tree to the boot loader 125 which is mounted on an application layer through a function of the second API.

In operation S305, the emulation program processing unit 113 which executes the interface module waits for an instruction from the second booting program base processing unit 114 which executes the second booting program base unit 124. The instruction from the second booting program base processing unit 114 may be an instruction to read the program to be booted which is received from the boot loader processing unit 115 which executes the boot loader 125 through the second API.

When the instruction from the second booting program base processing unit 114 is received, in operation S306, the emulation program processing unit 113 translates the instruction received from the second booting program base unit 124 into the first API. The emulation program processing unit 113 hands over the instruction translated into the first API, to the first booting program base processing unit 112 which executes the first booting program base unit 122. The second booting program base unit 124 may be operated using the function of the first API provided by the first booting program base unit 122 in operation S306.

In operation S307, the emulation program processing unit 113 which executes the interface module obtains an execution result from the first booting program base processing unit 112. In operation S308, the emulation program processing unit 113 returns the obtained execution result to the second booting program base processing unit 114. The processing by the emulation program processing unit 113 goes back to operation S305 to wait for an instruction from the second booting program base processing unit 114 which executes the second booting program base unit 124. The program to be booted is read into the main memory unit 130 by this processing.

According to the information processing device, the control method of the information processing device, and the control program, the first booting program base unit which is supported by a hardware installed in a computer and operates on a physical address, and the boot loader and the second booting program base unit which are supported by an OS and operates on a logical address may be included as booting programs. The second booting program base unit may be operated using a function of the first booting program base unit through the emulation. According to the information processing device, the control method of an information processing device, and the control program, when the second booting program base unit designed for a virtual address is operated on the first booting program base unit designed for a physical address, a complicated processing regarding a page boundary may not be generated and the processing load of the arithmetic processing unit may be reduced.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An information processing device, comprising:
    a storage configured to store a program to be booted, which is programmed to operate on a virtual address;
    a central processing unit (CPU) configured to start a plurality of booting programs including a first booting program which is programmed to operate on a physical address and a second booting program which is programmed to operate on a virtual address and read the program to be booted stored in the storage using a virtual address;
    a main memory configured to store the program to be booted from the storage;
    a memory configured to store the plurality of booting programs and a start module; and
    a controller, including an address translator that translates a virtual address into a physical address, configured to read the program to be booted from the storage based on a reception of the virtual address from the central processing unit, translate the virtual address into the physical address using the address translator and write the read program in a plurality of discontinuous areas of the main memory specified by the physical address,
    wherein the central processing unit starts, when the information processing device is turned on, the start module which performs transfer of the virtual address to the controller, sets a virtual address space in the central processing unit and the controller before the plurality of booting programs are booted and starts the first booting program after setting the virtual address space, reads the written program to be booted written by the controller from the main memory using the virtual address transferred to the controller, and starts the program to be booted and the second booting program after stating the first booting program.

2. The information processing device according to claim 1, wherein the first booting program provides a first function to an application program.

3. The information processing device according to claim 2, wherein the central processing unit executes a boot loader instructing the read of the program to be booted using a second function provided by the second booting program.

4. The information processing device according to claim 3, wherein the central processing unit executes an emulation program translating a read instruction which is instructed using the second function into the first function.

5. The information processing device according to claim 4, wherein the central processing unit hands over the read instruction translated into the first function to the controller.

6. The information processing device according to claim 1, wherein the first booting program includes at least one of a unified extensile firmware interface (UEFI) and a basic input/output system (BIOS).

7. The information processing device according to claim 1, wherein the second booting program includes an open firmware.

8. The information processing device according to claim 3, wherein the boot loader is an open firmware.

9. The information processing device according to claim 1, wherein the central processing unit performs operations of:
    creating an address translation table between a physical address and a virtual address;
    registering the address translation table in the central processing unit and the controller before booting the first booting program included in the plurality of booting programs is started;
    creating information on a memory resource and an input/output resource which are used in the first booting program using the virtual address; and
    registering the used virtual address in the central processing unit and the controller.

10. The information processing device according to claim 3, wherein the central processing unit builds a device tree by an interface translation for operating the second booting program on the first function, and boots the second booting program and the boot loader after building the device tree.

11. An information processing method, comprising:
    starting, by a central processing unit (CPU) in an information processing device, a start module stored in a memory that stores a plurality of booting programs including a first booting program which is programmed to operate on a physical address and a second booting program which is programmed to operate on a virtual address;
    supplying, to a controller including an address translator that translates a virtual address into a physical address, a virtual address to read a program to be booted which is programmed to operate on a virtual address and is stored in a storage;
    setting a virtual address space in the central processing unit and the controller before the plurality of booting programs is started;
    reading, by the controller, the program to be booted from the storage based on a reception of the virtual address;
    translating, by the controller, the virtual address into a physical address and writing the read program to be booted in a plurality of discontinuous areas of a main memory using the physical address;

starting the first booting program after setting the virtual address space;

reading, by the central processing unit, the written program to be booted written by the controller from the main memory using the virtual address; and starting the program to be booted and the second booting program after stating the first booting program.

12. The information processing method according to claim 11, wherein
the first booting program provides a first function to an application program.

13. The information processing method according to claim 12, further comprising:
executing a boot loader instructing the read of the program to be booted using a second function provided by the second booting program.

14. The information processing method according to claim 13, further comprising:
executing an emulation program translating a read instruction which is instructed using the second function into the first function.

15. The information processing method according to claim 14, further comprising:
handing over the read instruction translated into the first function to the controller.

16. A non-transitory recording medium storing a control program that causes a computer to execute processings, the processings comprising:

starting, by a central processing unit (CPU) in an information processing device, a start module stored in a memory that stores a plurality of booting programs including a first booting program which is programmed to operate on a physical address and a second booting program which is programmed to operate on a virtual address;

supplying, to a controller including an address translator that translates a virtual address into a physical address, a virtual address to read a program to be booted which is programmed to operate on a virtual address and is stored in a storage;

setting a virtual address space in the central processing unit and the controller before the plurality of booting programs is started;

reading, by the controller, the program to be booted from the storage based on a reception of the virtual address;

translating, by the controller, the virtual address into a physical address and writing the read program to be booted in a plurality of discontinuous areas of a main memory specified by the physical address;

starting the first booting program after setting the virtual address space;

reading, by the central processing unit, the written program to be booted written by the controller from the main memory using the virtual address; and starting the program to be booted and the second booting program after stating the first booting program.

* * * * *